US012028666B2

(12) United States Patent
Yamazaki

(10) Patent No.: US 12,028,666 B2
(45) Date of Patent: Jul. 2, 2024

(54) SOUND SYSTEM

(71) Applicant: TOYOTA JIDOSHA KABUSHIKI KAISHA, Aichi-ken (JP)

(72) Inventor: Keita Yamazaki, Nisshin (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 160 days.

(21) Appl. No.: 17/870,833

(22) Filed: Jul. 22, 2022

(65) Prior Publication Data

US 2023/0027096 A1 Jan. 26, 2023

(30) Foreign Application Priority Data

Jul. 26, 2021 (JP) ................................ 2021-122024

(51) Int. Cl.
*H04R 1/02* (2006.01)
*H04R 3/12* (2006.01)

(52) U.S. Cl.
CPC ............... *H04R 1/025* (2013.01); *H04R 3/12* (2013.01); *H04R 2460/13* (2013.01); *H04R 2499/13* (2013.01)

(58) Field of Classification Search
CPC ...... H04R 1/025; H04R 3/12; H04R 2460/13; H04R 2499/13
See application file for complete search history.

(56) References Cited

U.S. PATENT DOCUMENTS

2009/0154713 A1* 6/2009 Kamiya .................. H04S 7/302
381/1

FOREIGN PATENT DOCUMENTS

| | | | | | |
|---|---|---|---|---|---|
| CN | 112887853 | A | * | 6/2021 | |
| JP | 200195646 | A | | 4/2001 | |
| JP | 200223768 | A | | 1/2002 | |
| JP | 2005118248 | A | | 5/2005 | |
| JP | 2018125829 | A | | 8/2018 | |
| JP | 3219108 | U | | 11/2018 | |
| KR | 1673787 | B1 | * | 11/2016 | ............... B60N 2/48 |

* cited by examiner

*Primary Examiner* — Sunita Joshi
(74) *Attorney, Agent, or Firm* — HAUPTMAN HAM, LLP

(57) ABSTRACT

A bone conduction speaker is built into a seat of a vehicle and faces the skull of an occupant seated in the seat. An acoustic control ECU individually selects sound to be output from the bone conduction speaker for each of the occupants in the vehicle, according to attribute information of the occupant recorded in a portable terminal device carried by the occupant, and causes the selected sound to be individually output from the bone conduction speaker to each of the occupants.

3 Claims, 9 Drawing Sheets

| ATTRIBUTE INFORMATION | | | | CORRECT ANSWER INFORMATION | | | |
|---|---|---|---|---|---|---|---|
| AGE | GENDER | HOBBY | PREFER-ENCE | SONG | AIR CONDI-TIONING TEMP | ILLUMINA-TION INTENSITY | RECLINING ANGLE |
| 20S | MALE | SPORTS | POPS | SONG 1 | T1 | I1 | θ1 |
| : | : | : | : | : | : | : | : |

FIG. 8

| BEHAVIOR IN CABIN | SONG TITLE LIST | AIR CONDITIONING TEMPERATURE | ILLUMINATION INTENSITY | RECLINING ANGLE |
|---|---|---|---|---|
| SLEEPING | SONG 1, 2 ··· | T1 | I1 | $\theta$ 1 |
| RELAXING | SONG x1, x2 ··· | T2 | I2 | $\theta$ 2 |
| READING | SONG y1, y2 ··· | T3 | I3 | $\theta$ 3 |
| : | : | : | : | : |

56

SOUND SYSTEM

CROSS-REFERENCE TO RELATED APPLICATION

This application claims priority to Japanese Patent Application No. 2021-122024 filed on Jul. 26, 2021, incorporated herein by reference in its entirety.

BACKGROUND

1. Technical Field

The disclosure relates to a sound system.

2. Description of Related Art

A headrest of a vehicle seat described in Japanese Unexamined Patent Application Publication No. 2001-95646 (JP 2001-95646 A) has speakers embedded in the headrest, with the vertical and lateral positions of the speakers adjustable.

SUMMARY

The speaker described in JP 2001-95646 A is an ordinary speaker (air conduction speaker); therefore, leakage of relatively large air-conducted sound (hereinafter simply referred to as "sound leakage") would take place even if the speaker is positioned so as to be close to the ear of the occupant. Thus, according to the technology described in JP 2001-95646 A, when each of the occupants in the vehicle listens to sound such as music individually, the quality of the sound heard may significantly deteriorate due to the influence of the sound leakage from the ambience.

The disclosure provides a sound system that can improve the quality of sound heard, when each occupant in a moving object listens to sound such as music individually.

A sound system according to a first aspect includes a bone conduction speaker that is built into a seat of a moving object and faces a skull of an occupant seated in the seat, and a controller configured to individually select sound to be output from the bone conduction speaker for each of the occupants in the moving object, according to attribute information of the occupant recorded in a portable terminal device carried by the occupant, and cause the selected sound to be individually output from the bone conduction speaker to each of the occupants.

In the first aspect, the sound is individually output from the bone conduction speaker that is bult into the seat of the moving object and faces the skull of the occupant seated in the seat, to each of the occupants. Thus, the use of the bone conduction speaker can reduce sound leakage; therefore, when each of the occupants in the moving object listens to sound such as music individually, the quality of the sound heard can be improved. Also, in the first aspect, the sound output from the bone conduction speaker is selected according to the occupant attribute information recorded in the portable terminal device, thus making it unnecessary for the occupant himself/herself to perform operation to select the sound.

A sound system according to a second aspect includes a bone conduction speaker that is built into a seat of a moving object and faces a skull of an occupant seated in the seat, and a controller configured to individually select sound to be output from the bone conduction speaker for each of the occupants in the moving object, according to operation of a portable terminal device carried by the occupant or operation of a control device installed in the moving object, and cause the selected sound to be individually output from the bone conduction speaker to each of the occupants.

In the second aspect, as in the first aspect, the sound is individually output from the bone conduction speaker to each of the occupants, so that sound leakage can be reduced. Thus, when each of the occupants in the moving object listens to sound such as music individually, the quality of the sound heard can be improved. Also, in the second aspect, the sound output from the bone conduction speaker is selected according to operation of the portable terminal device or operation of the control device, thus making it possible for the occupant himself/herself to select the sound the occupant wishes to hear.

The sound system according to the first aspect or the second aspect may further include an adjustment unit configured to cooperate with at least one of an air conditioning device, an illuminating device, and a seat angle adjusting device provided in the moving object, to adjust at least one of air conditioning, illumination, and a seat angle, according to the sound caused by the controller to be output from the bone conduction speaker.

With the above configuration, at least one of the air conditioning, illumination, and seat angel is adjusted, so that the occupant can hear the sound in conditions more suitable for the occupant's body.

In the sound system as described above, the sound caused by the controller to be output from the bone conduction speaker may be music, and the controller may be configured to obtain data of the music to be output from the bone conduction speaker, from an external music distribution server via an in-vehicle communication device that is installed in the moving object and is allowed to communicate with an outside of the moving object.

With the above configuration, the occupant can enjoy a larger number of tunes, by retrieving music data from the external music distribution server.

The sound system as described above may further include an air-conducted sound absorber provided around a portion of the seat corresponding to the bone conduction speaker.

With the above arrangement, the air-conducted sound leaked from the bone conduction speaker is absorbed by the air-conducted sound absorber, so that the sound leakage from the bone conduction speaker can be further reduced.

The disclosure provides the effect of improving the quality of sound heard when each of the occupants in the moving object listens to sound such as music individually.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8 is a table showing one example of a song list table; and

DETAILED DESCRIPTION OF EMBODIMENTS

One embodiment of the disclosure will be described in detail with reference to the drawings.

First Embodiment

Figure 1:
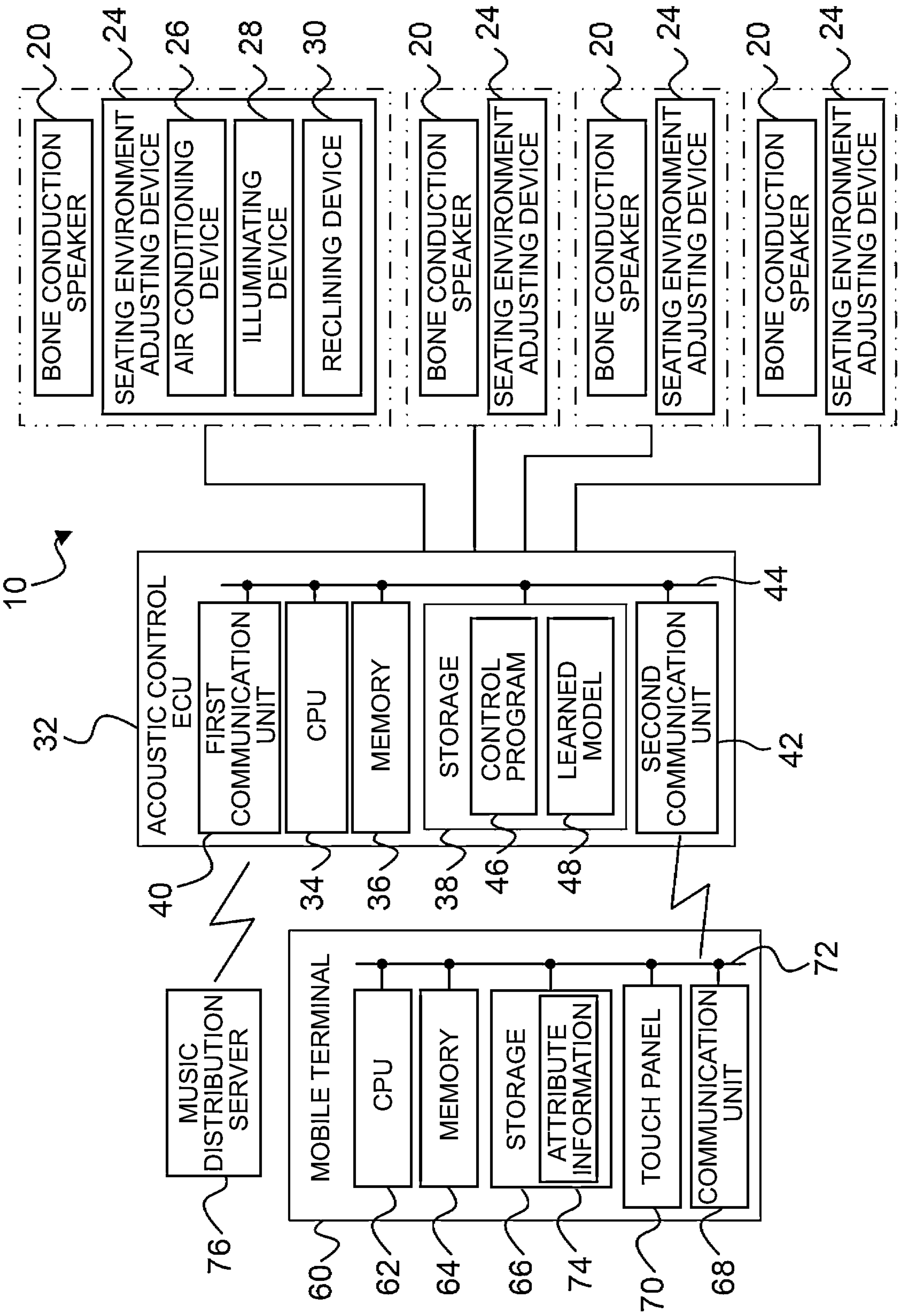
FIG. 1 is a block diagram schematically showing the configuration of a sound system according to a first embodiment.

In FIG. 1, a sound system 10 installed in a vehicle is shown. The sound system 10 includes a bone conduction speaker 20 and a seating environment adjusting device 24 provided for each of a plurality of seats 12 (see FIG. 2) of a vehicle as one example of a moving object, and an acoustic control electronic control unit (ECU) 32. While four seats are provided as the seats 12 in the vehicle in the embodiment shown in FIG. 1, the number of the seats 12 provided in the vehicle is not limited to four.

Figure 2:
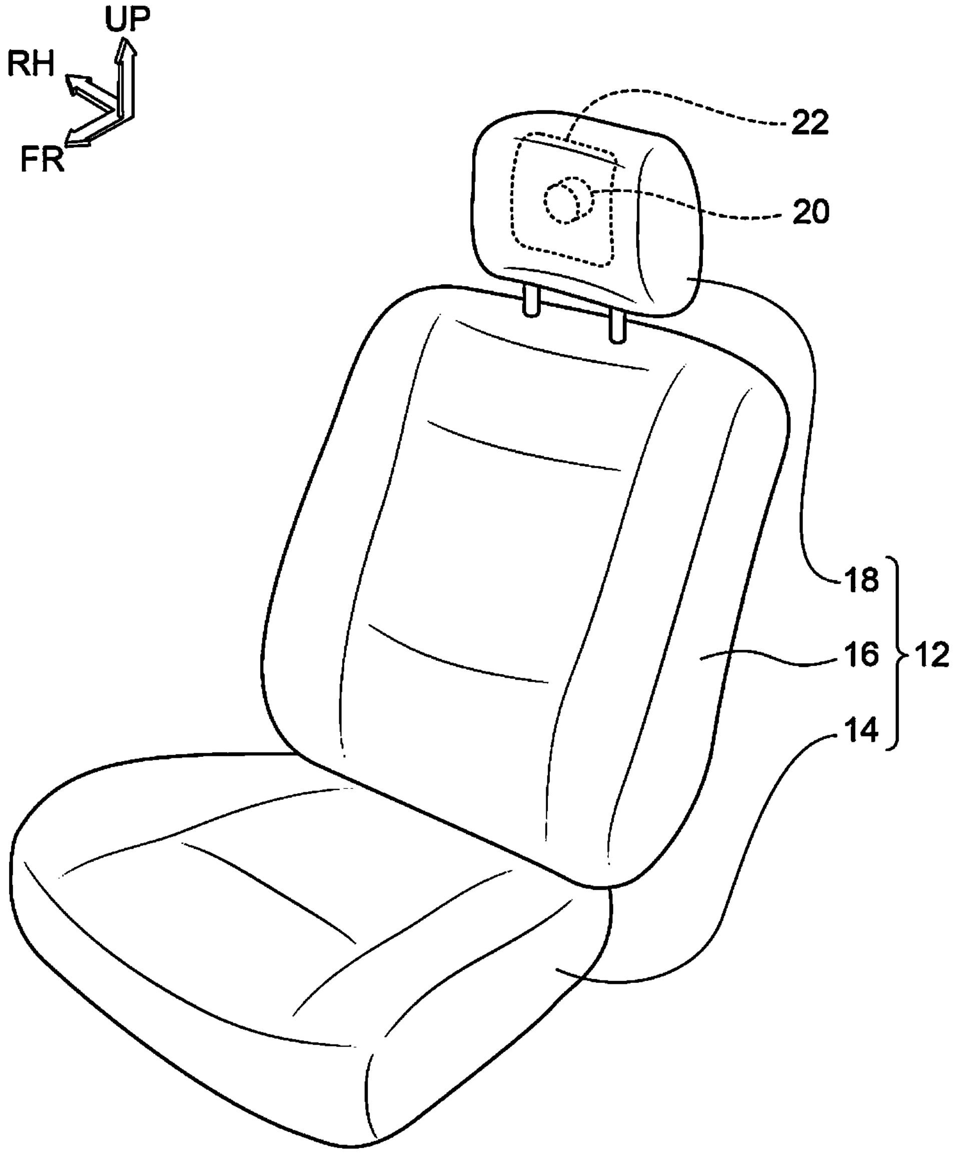
FIG. 2 is a perspective view of a seat provided in a vehicle.
Figure 3:
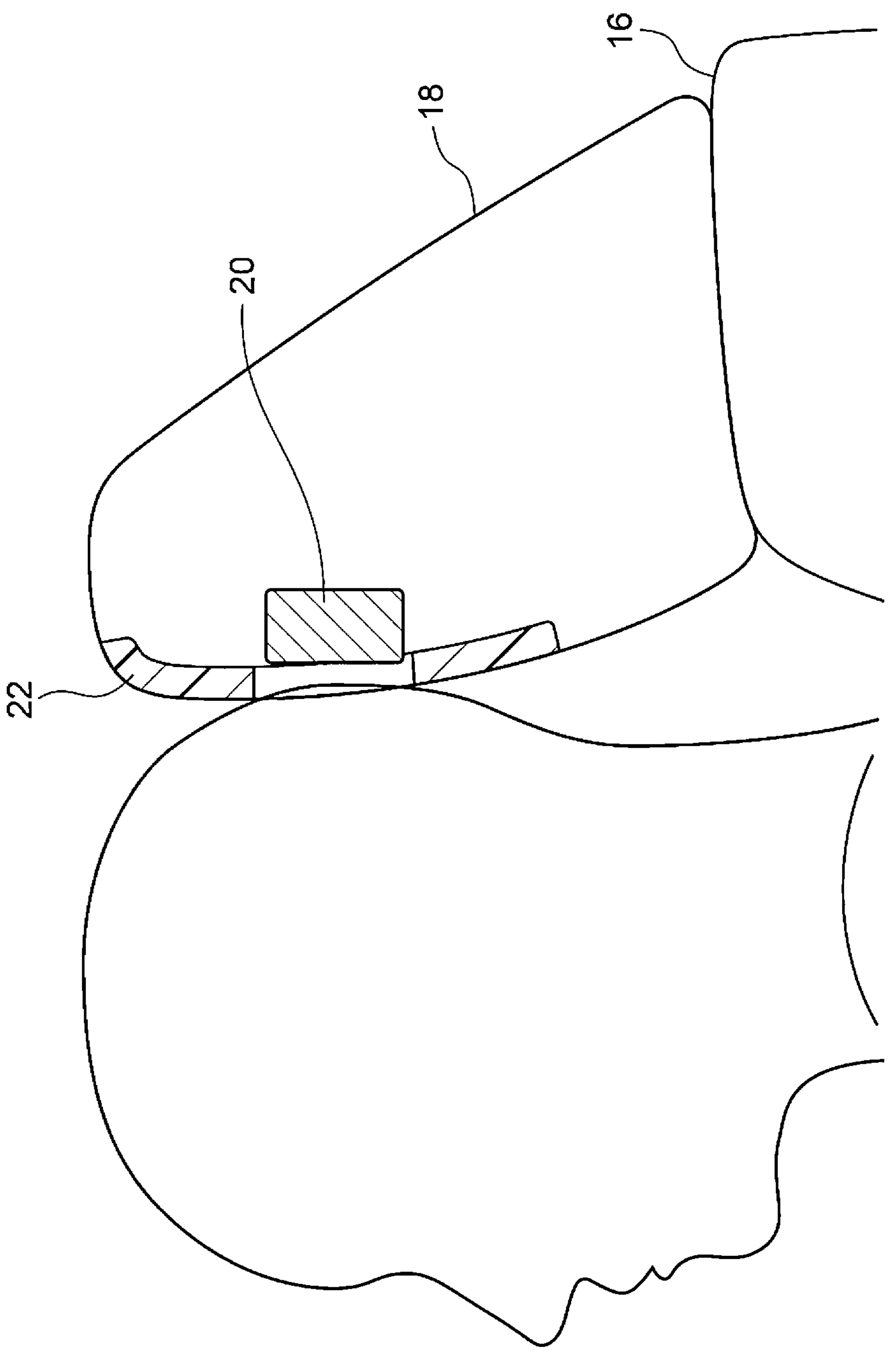
FIG. 3 is a side view of a headrest of the seat.

As shown in FIG. 2, the seat 12 includes a seat cushion 14, a seat back 16, and a headrest 18. The bone conduction speaker 20 is built into the headrest 18. More specifically, the position of the bone conduction speaker 20 is adjusted such that the bone conduction speaker 20 faces the skull of the occupant seated in the seat 12, as shown in FIG. 3. The bone conduction speaker 20 receives audio data such as music data from the acoustic control ECU 32, converts the received audio data into bone-conducted sound, and outputs the sound.

As shown in FIG. 2, a sound-absorbing sheet 22 is provided around a portion of the headrest 18 of each seat 12 corresponding to the bone conduction speaker 20. The sound-absorbing sheet 22 is one example of the air-conducted sound absorber, and absorbs air-conducted sound leaked from the bone conduction speaker 20, thereby to reduce the air-conducted sound.

As shown in FIG. 1, each of the seating environment adjusting devices 24 includes an air conditioning device 26, an illuminating device 28, and a reclining device 30. The air conditioning device 26 performs air conditioning on the space around the corresponding seat 12 in the cabin. The illuminating device 28 illuminates the area around the corresponding seat 12, such that the illumination intensity is adjustable. The reclining device 30 adjusts the angle (reclining angle) of the seat back 16 of the corresponding seat 12 by means of an actuator. The reclining device 30 is one example of the seat angle adjusting device.

The acoustic control ECU 32 includes a central processing unit (CPU) 34, a memory 36 such as a read-only memory (ROM) and a random access memory (RAM), and a non-volatile storage 38 such as a hard disk drive (HDD) or a solid state drive (SDD). The acoustic control ECU 32 also includes a first communication unit 40 capable of wirelessly communicating with the outside of the vehicle including a music distribution server 76, and a second communication unit 42 capable of wirelessly communicating with a mobile terminal 60 carried by each of the occupants seated in the seats 12. The CPU 34, memory 36, storage 38, first communication unit 40, and second communication unit 42 are communicably connected to each other via an internal bus 44. The first communication unit 40 is one example of the in-vehicle communication device.

Figure 4:
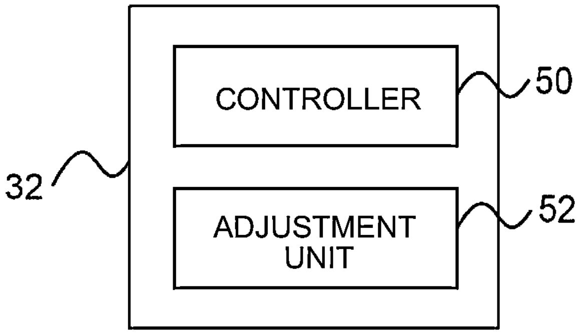
FIG. 4 is a functional block diagram of an acoustic control electronic control unit (ECU)

The storage 38 stores a control program 46 and learned models 48. When the control program 46 is read from the storage 38 and extracted into the memory 36, and the control program 46 extracted into the memory 36 is executed by the CPU 34, the acoustic control ECU 32 functions as a controller 50 and an adjustment unit 52 shown in FIG. 4. The learned models 48 will be described later.

The controller 50 individually selects the sound to be output from the bone conduction speaker 20 for each of the occupants, according to attribute information 74 of the occupant stored in the storage 66 of the mobile terminal 60 carried by the occupant, and causes the selected sound to be individually output from the bone conduction speaker 20 to each occupant. The adjustment unit 52 cooperates with the air conditioning device 26, illuminating device 28, and reclining device 30 provided in the vehicle, to adjust the air conditioning temperature, illumination intensity, and reclining angle, according to the sound caused by the controller 50 to be output from the bone conduction speaker 20.

The music distribution server 76 stores music data in a storage (not shown), and distributes music data requested by the acoustic control ECU 32 to the acoustic control ECU 32. The mobile terminal 60 includes a CPU 62, a memory 64 such as ROM and RAM, a non-volatile storage 66 such as SSD or HDD, a communication unit 68, and a touch panel 70. The CPU 62, memory 64, storage 66, communication unit 68, and touch panel 70 are communicably connected to each other via an internal bus 72.

In the first embodiment, the attribute information 74 of the occupant carrying the mobile terminal 60 is stored in the storage 66 of the mobile terminal 60. The attribute information 74 includes information such as the occupant's age, gender, hobby, and music preference. The attribute information 74 is entered by the occupant carrying the mobile terminal 60 and stored in advance in the storage 66, when a specific application (specific app) for making the mobile terminal 60 function as the portable terminal device in this disclosure is installed on the mobile terminal 60, for example.

Figure 5:
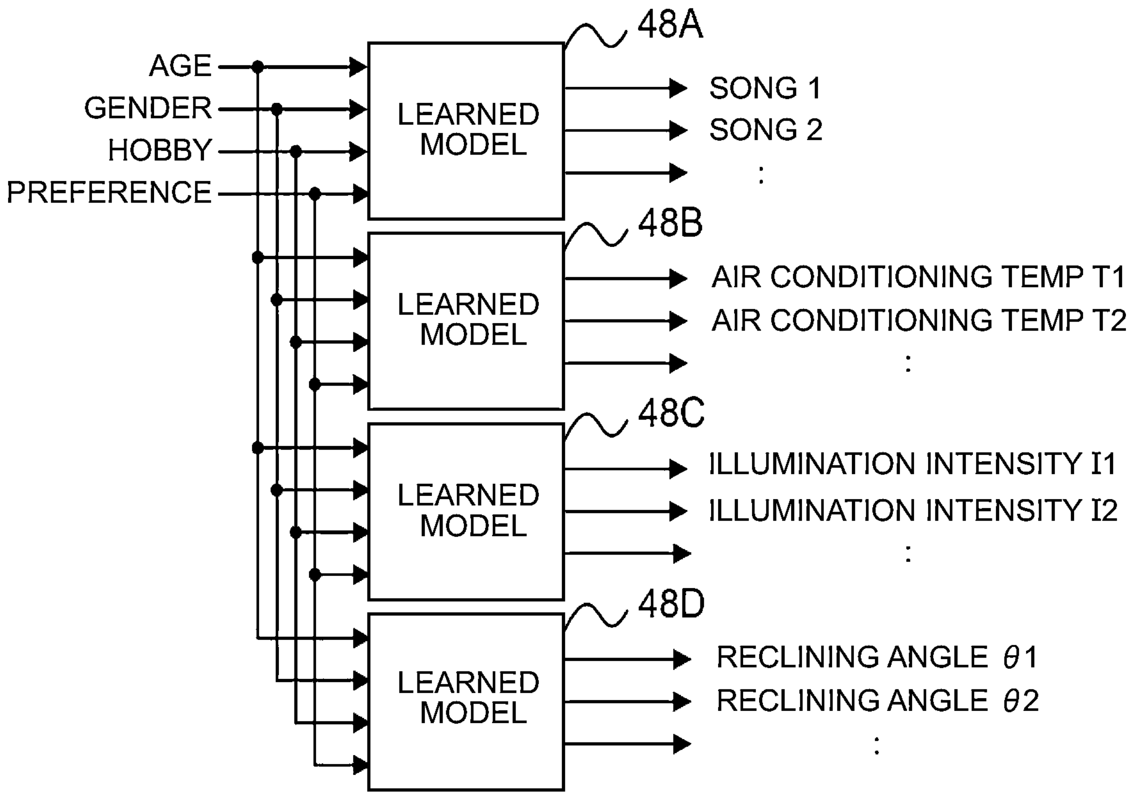
FIG. 5 is a schematic view showing one example of data for learning and learned models.

Next, the operation of the first embodiment will be described. In the first embodiment, the learned models 48 are created using data for learning 54 as shown in FIG. 5 by way of example. In the data for learning 54, the attribute information of an occupant including the occupant's age, gender, hobby, and music preference, which was collected when the occupant rode in the vehicle in the past, is associated with correct answer information including the song the occupant instructed to play, the air conditioning temperature T instructed by the occupant to the air conditioning device 26, the illumination intensity I instructed by the occupant to the illuminating device 28, and the reclining angle θ instructed by the occupant to the reclining device 30.

For example, the data for learning 54 shown in FIG. 5 indicates that the occupant whose age is "20s", gender is "male", hobby is "sports", and music preference is "pops" gave commands to play "SONG 1", set the air conditioning device 26 at the air conditioning temperature "T1", set the illuminating device 28 at the illumination intensity "I1", and set the reclining device 30 at the reclining angle "θ1", when the occupant rode in the vehicle in the past.

In the first embodiment, the learned models 48 include a learned model 48A used for retrieving information on the song to be played from the occupant's attribute information, a learned model 48B used for retrieving the air conditioning temperature T from the occupant's attribute information, a learned model 48C used for retrieving the illumination intensity I from the occupant's attribute information, and a learned model 48D used for retrieving the reclining angle θ from the occupant's attribute information.

The learned model 48A is created by learning a model for retrieving information on the song to be played from the occupant's attribute information, based on the data for learning 54. The learned model 48B is created by learning a model for retrieving the air conditioning temperature T from the occupant's attribute information, based on the data for learning 54. The learned model 48C is created by learning a model for retrieving the illumination intensity I from the occupant's attribute information, based on the data for learning 54. The learned model 48D is created by learning a model for retrieving the reclining angle θ from the occupant's attribute information, based on the data for learning 54.

The data for learning 54 is data corresponding to commands given by occupants when the occupants rode in the vehicle in the past; therefore, the commands given by the occupants when the occupants rode in the vehicle in the past are reflected by the learned models 48A to 48D. In this connection, a neural network may be used as one example of the model, and deep learning may be used as one example of a learning algorithm, but the model and learning algorithm are not limited to these.

Figure 6:
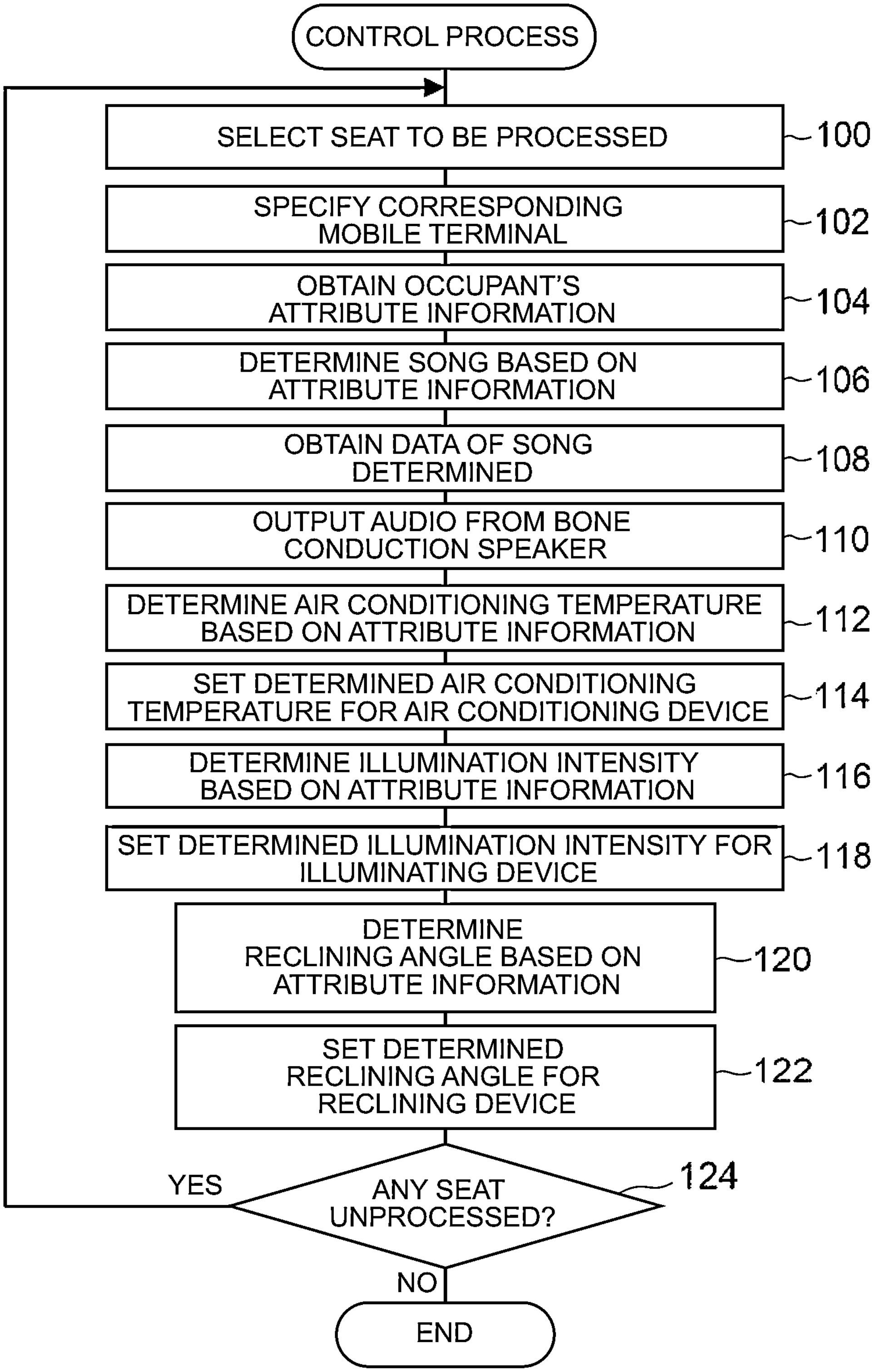
FIG. 6 is a flowchart illustrating a control process in the first embodiment.

Referring next to FIG. 6, a control process executed by the acoustic control ECU 32 (the controller 50 and the adjustment unit 52) will be described. In step 100 of the control process, the controller 50 selects a seat 12 to be dealt with in the following step 102 to step 122, from among a plurality of seats 12 provided in the vehicle.

In step 102, the controller 50 specifies the mobile terminal 60 carried by the occupant seated in the seat 12 concerned, among the mobile terminals 60 respectively carried by the occupants seated in the seats 12 of the vehicle, based on the positions of the respective mobile terminals 60 in the cabin. In step 104, the controller 50 obtains the attribute information (e.g., the age, gender, hobby, and music preference) of the occupant carrying the mobile terminal 60 concerned, from the specific application of the mobile terminal 60 specified in step 102.

In step 106, the controller 50 determines a song to be output from the bone conduction speaker 20 provided in the seat 12 concerned, based on the attribute information obtained in step 104 and the learned model 48A stored in the storage 38. In step 108, the controller 50 obtains data of the song determined in step 106 from the music distribution server 76. Then, in step 110, the controller 50 causes the bone conduction speaker 20 to output audio using the data obtained in step 108.

In the next step 112, the adjustment unit 52 determines the air conditioning temperature T to be set for the air conditioning device 26 corresponding to the seat 12 concerned, based on the attribute information obtained in step 104 and the learned model 48B stored in the storage 38. In step 114, the adjustment unit 52 sets the air conditioning temperature T determined in step 112, for the air conditioning device 26 corresponding to the seat 12 concerned. As a result, the air conditioning device 26 corresponding to the seat 12 concerned performs air conditioning on the space around the seat 12 concerned, using the set air conditioning temperature T as the target temperature.

In step 116, the adjustment unit 52 determines the illumination intensity I to be set for the illuminating device 28 corresponding to the seat 12 concerned, based on the attribute information obtained in step 104 and the learned model 48C stored in the storage 38. In step 118, the adjustment unit 52 sets the illumination intensity I determined in step 116, for the illuminating device 28 corresponding to the seat 12 concerned. As a result, the area around the seat 12 concerned is illuminated at the set illumination intensity I by the illuminating device 28 corresponding to the seat 12 concerned.

In step 120, the adjustment unit 52 determines the reclining angle θ to be set for the reclining device 30 corresponding to the seat 12 concerned, based on the attribute information obtained in step 104 and the learned model 48D stored in the storage 38. In step 122, the adjustment unit 52 sets the reclining angle θ determined in step 120 for the reclining device 30 corresponding to the seat 12 concerned. As a result, the reclining angle of the seat 12 concerned is adjusted to the set reclining angle θ, by the reclining device 30 corresponding to the seat 12 concerned.

In step 124, the controller 50 determines whether there is any seat 12 that has not been subjected to the process of step 102 to step 122. When an affirmative decision (YES) is obtained in step 124, the controller 50 returns to step 100, selects another seat 12 as the one to be dealt with in the process of step 102 to step 122, and repeats the process. When a negative decision (NO) is obtained in step 124, the control process ends.

As described above, in the first embodiment, the bone conduction speaker 20 is built into the seat 12 of the vehicle such that it faces the skull of the occupant seated in the seat 12. The controller 50 selects the sound to be output from the bone conduction speaker 20 for each of the occupants individually, according to the occupant's attribute information recorded in the mobile terminal 60 carried by the occupant, and causes the selected sound to be output from the bone conduction speaker 20 to the occupant concerned. Thus, the use of the bone conduction speaker 20 can reduce sound leakage; therefore, when each of the vehicle occupants listens to sound such as music individually, the quality of the sound thus heard can be improved. Also, the sound output from the bone conduction speaker 20 is selected according to the occupant's attribute information recorded in the mobile terminal 60, thus making it unnecessary for the occupant himself/herself to select the sound.

In the first embodiment, the adjustment unit 52 cooperates with the air conditioning device 26, illuminating device 28, and reclining device 30 provided in the vehicle to adjust the air conditioning temperature T, illumination intensity I, and reclining angle θ, respectively, according to the sound caused by the controller 50 to be output from the bone conduction speaker 20. With the air conditioning temperature T, illumination intensity I, and reclining angle θ thus adjusted, the occupant can hear the sound in conditions more suitable for his/her body.

In the first embodiment, the sound caused by the controller 50 to be output from the bone conduction speaker 20 is music, and the controller 50 obtains data of the music to be output from the bone conduction speaker 20, from the music distribution server 76 via the first communication unit 40. Thus, the occupants can enjoy a greater number of tunes by obtaining music data from the music distribution server 76.

In the first embodiment, the sound-absorbing sheet 22 is provided around the portion of the seat 12 corresponding to the bone conduction speaker 20. With this arrangement, the air-conducted sound leaked from the bone conduction speaker 20 is absorbed by the sound-absorbing sheet 22, so that sound leakage from the bone conduction speaker 20 can be further reduced.

Second Embodiment

Next, a second embodiment of the disclosure will be described. In the second embodiment, the same reference signs are assigned to the same components as those of the first embodiment, and description of these components will be omitted.

Figure 7:
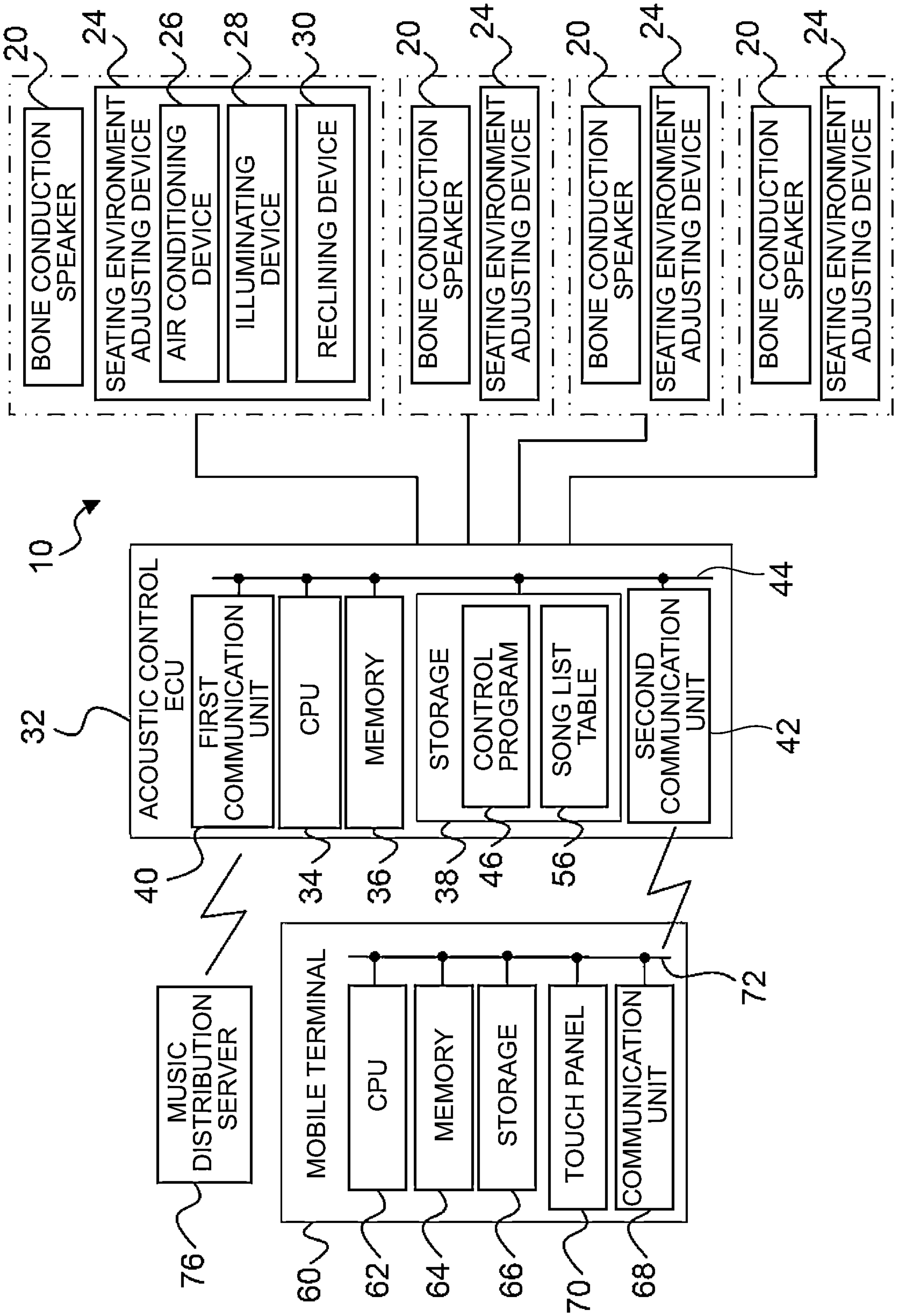
FIG. 7 is a block diagram schematically showing the configuration of a sound system according to a second embodiment.

As shown in FIG. 7, the acoustic control ECU 32 according to the second embodiment has a song list table 56 stored in the storage 38, instead of the learned models 48 described above in the first embodiment. As shown in FIG. 8, in the song list table 56, a plurality of behaviors (sleeping, relaxing, reading, etc.) are registered in advance as occupant's behaviors in the cabin. In the song list table 56, a song title list of songs as background music suitable for each behavior of the occupant in the cabin is registered in advance.

Furthermore, in the song list table 56, the air conditioning temperature T, illumination intensity I, and reclining angle θ suitable for each behavior of the occupant in the cabin are registered in advance, with respect to each behavior. In the case where the behavior is "sleeping", for example, a slightly cooler temperature is registered as the air conditioning temperature T, a relatively dark illumination is registered as the illumination intensity I, and an angle that makes the seat 12 flat is registered as the reclining angle θ.

The controller 50 according to the second embodiment individually selects the sound to be output from the bone conduction speaker 20 for each of the occupants, according to operation of the mobile terminal 60 carried by the occupant, and causes the selected sound to be individually output from the bone conduction speaker 20 to each of the occupants.

Figure 9:
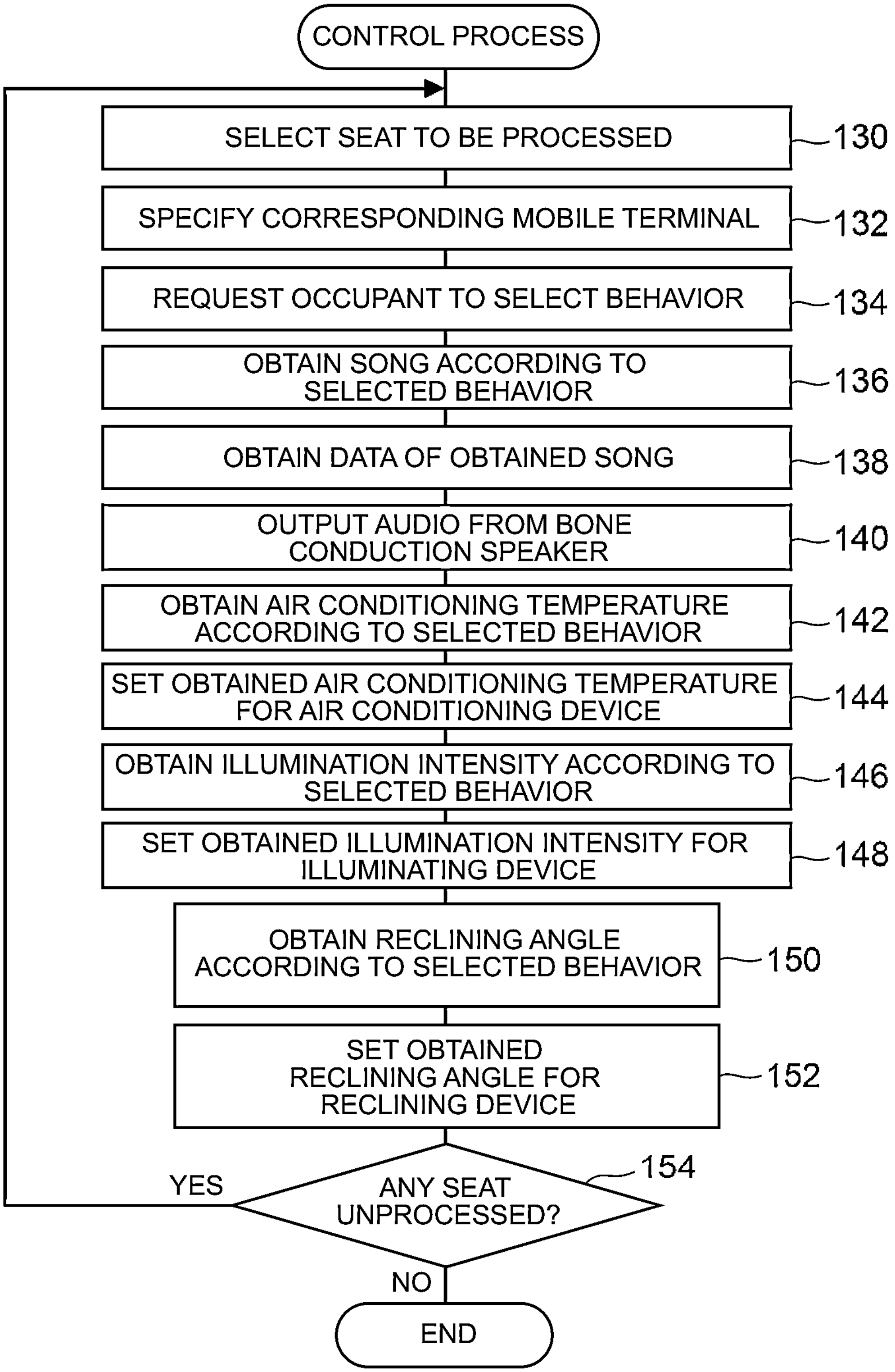
FIG. 9 is a flowchart illustrating a control process in the second embodiment.

Referring next to FIG. 9, a control process according to the second embodiment will be described. In step 130, the controller 50 selects a seat 12 to be dealt with in the following step 132 to step 152 below, from among a plurality of seats 12 provided in the vehicle. In step 132, the controller 50 specifies the mobile terminal 60 carried by the occupant seated in the seat 12 concerned, among the mobile terminals 60 respectively carried by the occupants seated in the respective seats 12 of the vehicle, based on the positions of the respective mobile terminals 60 in the cabin.

In step 134, the controller 50 cooperates with a specific application installed in the mobile terminal 60 specified in step 132, to have the touch panel 70 display a message requesting the occupant to select the behavior he/she is about to perform in the cabin. Then, the occupant seated in the seat 12 concerned selects the behavior he/she is about to perform in the cabin, from among a plurality of options (sleeping, relaxing, reading, etc.).

In step 136, the controller 50 obtains a song title list corresponding to the behavior selected by the occupant in step 134, from the song list table 56. In step 138, the controller 50 obtains music data of each song in the song title list obtained in step 136 from the music distribution server 76. Then, in step 140, the controller 50 causes the bone conduction speaker 20 to output music, based on the music data obtained from the music distribution server 76 in step 138.

In step 142, the adjustment unit 52 obtains the air conditioning temperature T corresponding to the behavior selected by the occupant in step 134 from the song list table 56. Then, in step 144, the adjustment unit 52 sets the air conditioning temperature T obtained in step 142 for the air conditioning device 26 corresponding to the seat 12 concerned. As a result, the air conditioning device 26 corresponding to the seat 12 concerned performs air conditioning on the space around the seat 12 concerned, using the set air conditioning temperature T as the target temperature.

In step 146, the adjustment unit 52 obtains the illumination intensity I corresponding to the behavior selected by the occupant in step 134 from the song list table 56. In step 148, the adjustment unit 52 sets the illumination intensity I obtained in step 146 for the illuminating device 28 corresponding to the seat 12 concerned. As a result, the area around the seat 12 concerned is illuminated at the illumination intensity I by the illuminating device 28 corresponding to the seat concerned.

In step 150, the adjustment unit 52 obtains the reclining angle θ corresponding to the behavior selected by the occupant in step 134 from the song list table 56. In step 152, the adjustment unit 52 sets the reclining angle θ obtained in step 150 for the reclining device 30 corresponding to the seat 12 concerned. As a result, the reclining angle of the seat 12 concerned is adjusted to the set reclining angle θ by the reclining device 30 corresponding to the seat 12 concerned.

In step 154, the controller 50 determines whether there is any seat 12 that has not been subjected to the process of step 132 to step 152. When an affirmative decision (YES) is obtained in step 154, the controller 50 returns to step 130 to select another seat 12 to be dealt with in the process of step 132 to step 152 and repeats the process. When a negative decision (NO) is obtained in step 154, the control process ends.

Thus, in the second embodiment, the bone conduction speaker 20 is built into the seat 12 such that it faces the skull of the occupant seated in the seat 12 of the vehicle. The controller 50 individually selects the sound to be output from the bone conduction speaker 20 for each of the occupants, according to the operation of the mobile terminal 60 carried by the occupant, and causes the selected sound to be output from the bone conduction speaker 20 to each occupant individually. Thus, the use of the bone conduction speaker 20 can reduce sound leakage; therefore, when each of the vehicle occupants listens to sound such as music individually, the quality of the sound thus heard can be improved. Also, the sound to be output from the bone conduction speaker 20 is selected according to the operation of the mobile terminal 60, thus making it possible for the occupant himself/herself to select the sound he/she wishes to hear.

In the second embodiment, the sound to be output from the bone conduction speaker 20 is individually selected for each of the occupants according to the operation of the mobile terminal 60, but the manner of selection is not limited to this. For example, the sound to be output from the bone conduction speaker 20 may be individually selected for each occupant, according to operation of a control device installed in the vehicle.

In the second embodiment, the occupant operates the touch panel 70 of the mobile terminal 60 to select the behavior in the cabin, and the music in the song title list corresponding to the selected behavior is output from the bone conduction speaker 20. However, the manner of outputting the music is not limited to this. For example, the occupant may directly select music to be played by operating the touch panel 70 of the mobile terminal 60, and the acoustic control ECU 32 may cause the bone conduction speaker 20 to output the music selected by the occupant.

While music is output from the bone conduction speaker 20 in the illustrated embodiments, the sound output from the bone conduction speaker 20 is not limited to music. For example, a video such as a movie may be displayed on the touch panel 70 of the mobile terminal 60, and voice of the video displayed on the touch panel 70 of the mobile terminal 60 may be output from the corresponding bone conduction speaker 20. Also, a display may be provided for each seat 12, and the video may be displayed on the display, in place of the touch panel 70 of the mobile terminal 60.

The vehicle described in the illustrated embodiments may be a vehicle used for ride-sharing. In this case, the specific application described in the illustrated embodiments may be incorporated in a matching application for ride-sharing In the illustrated embodiments, the vehicle is used as one example of the moving object. However, the moving object in the disclosure is not limited to vehicles, but may be selected from other moving objects, such as trains, ships, and airplanes.

What is claimed is:

1. A sound system, comprising:
- a bone conduction speaker that is built into a seat of a moving object and faces a skull of an occupant seated in the seat;
- a controller configured to
  - individually select sound to be output from the bone conduction speaker for each of the occupants in the moving object, according to attribute information of the each of the occupants recorded in a portable terminal device carried by the each of the occupants, and
  - cause the selected sound to be individually output from the bone conduction speaker to the each of the occupants; and
- an adjustment unit configured to cooperate with at least one of an air conditioning device, an illuminating device, and a seat angle adjusting device provided in the moving object, to adjust at least one of air conditioning, illumination, and a seat angle, according to the sound caused by the controller to be output from the bone conduction speaker.

2. The sound system according to claim 1, wherein:
- the sound caused by the controller to be output from the bone conduction speaker is music; and
- the controller is configured to obtain data of the music to be output from the bone conduction speaker, from an external music distribution server via an in-vehicle communication device that is installed in the moving object and is allowed to communicate with an outside of the moving object.

3. The sound system according to claim 1, further comprising:
- an air-conducted sound absorber provided around a portion of the seat corresponding to the bone conduction speaker.

* * * * *